(12) United States Patent
Golzarian et al.

(10) Patent No.: US 7,229,484 B2
(45) Date of Patent: Jun. 12, 2007

(54) PRE-COATED PARTICLES FOR CHEMICAL MECHANICAL POLISHING

(75) Inventors: Reza M. Golzarian, Beaverton, OR (US); Mansour Moinpour, San Jose, CA (US); Andrea C. Oehler, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 10/307,274

(22) Filed: Nov. 27, 2002

(65) Prior Publication Data

US 2004/0106361 A1    Jun. 3, 2004

(51) Int. Cl.
- C09K 3/14 (2006.01)
- B05D 3/00 (2006.01)
- B05D 5/00 (2006.01)
- B05D 1/00 (2006.01)
- B24B 37/04 (2006.01)

(52) U.S. Cl. ............... 51/307; 51/308; 51/309; 427/212; 427/215; 427/220; 427/221; 427/248.1; 427/255.21; 427/255.6; 427/427; 106/3

(58) Field of Classification Search ............... 51/307, 51/308, 309; 106/3; 438/692, 693; 427/212, 427/215, 220, 221, 248.1, 255.14, 255, 21, 427/255.6, 421, 427, 424, 255.21
See application file for complete search history.

(56) References Cited

U.S. PATENT DOCUMENTS

| 4,447,516 | A | * | 5/1984 | Matkan | ............ | 430/110.2 |
| 4,469,637 | A | * | 9/1984 | Charles | ............ | 556/17 |
| 5,340,370 | A |   | 8/1994 | Cadien et al. | | |
| 5,516,346 | A |   | 5/1996 | Cadien et al. | | |
| 5,836,806 | A |   | 11/1998 | Cadien et al. | | |
| 5,876,490 | A | * | 3/1999 | Ronay | ............ | 106/3 |
| 5,911,111 | A |   | 6/1999 | Bohr et al. | | |
| 5,954,975 | A |   | 9/1999 | Cadien et al. | | |
| 6,046,099 | A |   | 4/2000 | Cadien et al. | | |
| 6,178,585 | B1 |   | 1/2001 | Cadien et al. | | |
| 6,293,848 | B1 | * | 9/2001 | Fang et al. | ............ | 451/36 |
| 6,325,705 | B2 |   | 12/2001 | Burke et al. | | |
| 6,447,563 | B1 | * | 9/2002 | Mahulikar | ............ | 51/309 |
| 2003/0124959 | A1 | * | 7/2003 | Schroeder et al. | ............ | 451/41 |

OTHER PUBLICATIONS

Copper and Tantalum Chemical-Mechanical Planarisation: Some Recent Progress, Ying Li & S. V. Babu, Clarkson University, Potsdam, NY, USA (Semiconductor Fabtech—13th Edition, pp. 259-261, no date.

* cited by examiner

Primary Examiner—Michael Marcheschi
(74) Attorney, Agent, or Firm—Blakely, Sokoloff, Taylor & Zafman LLP

(57) ABSTRACT

The present invention relates to the manufacture and use of novel pre-coated abrasive particles and particle slurries for the chemical mechanical polishing (CMP) of semiconductor wafers, thin films, inter-layer dielectric, metals, and other components during integrated circuit, flat panel display, or MEMS manufacturing. For example, polishing slurry abrasive particles can be pre-coated with additives, such as, inhibitors and/or surfactants during manufacture of the abrasive particles or slurry. The additive's opportunity to react directly with the abrasive particles early in the particle manufacturing process provides a slurry having a more stable, selectable, and predictable ratio of abrasive particles pre-coated with a more stable, selectable, and predictable amount and type of additives.

11 Claims, 4 Drawing Sheets

PRE-COATED PARTICLES FOR CHEMICAL MECHANICAL POLISHING

BACKGROUND

1. Field

Polishing slurries and particles.

2. Background

Typical integrated circuit ("IC") manufacturing techniques involve the fabrication of multiple IC chips on a single semiconductor or substrate wafer. In turn, each chip may be made up of millions of electronic devices (e.g., transistors, resistors, capacitors) formed in the silicon substrate. Generally, the function of each device is dictated by the chemical makeup and geography of the substances it contains. Thus, during fabrication, the formation of these devices involves a sequence of operations aimed at adding, shaping and removing various chip substances by having these substances grown, deposited, removed, chemically altered, and polished in selected areas on the wafer. For instance, the surface of a wafer may be polished to assure that the device surfaces are flat or to remove excess material from the surface of the devices prior to the next manufacturing operation. Polishing of wafer surfaces is often referred to as "planarization".

One technique for planarizing the top surface of semiconductor wafers is to polish the surface using a polishing "slurry" having abrasive particles mixed in a solution or suspension agent in a chemical-mechanical polishing (CMP) process. CMP processes and slurries are used for the polishing of semiconductor wafers, inter-layer dielectric layers, metal layers or lines, thin films, and other components during integrated circuit manufacturing. For instance, CMP is often used for planarizing tungsten interconnects, vias and contacts. CMP slurries typically include abrasive particles such as alumina; silica or ceria, such as oxides of aluminum, silicon or cerium; a ferric salt oxidizer such as ferric nitrate; a suspension agent such as propylene glycol; and deionized water. In CMP, the abrasive particles provide friction while oxidants and/or etchants can be used to cause a chemical reaction at the wafer surface. Slurry additives can also be used to enhance the removal rate, uniformity, selectivity, etc.

In a typical chemical mechanical polishing process, the substrate or wafer is placed face-down on a polishing pad which is attached to a rotatable table. In this way, the material to be polished (e.g., a tungsten or copper film) is placed in direct contact with pad. A carrier can be used to hold the wafer, as well as to apply a downward pressure against the backside of substrate. During the polishing process, pad and table are rotated while a downward force is placed on substrate by carrier. The abrasive and chemically reactive solution or "slurry" is introduced or deposited onto the pad during polishing. The slurry initiates the polishing process by chemically reacting with the material (e.g., a film) being polished. The polishing process is facilitated by the rotational movement of pad relative to wafer as slurry is provided to the wafer/pad interface. Polishing is continued in this manner until a desired amount of the material (e.g., all of the film on the insulator) is removed.

Commercially available CMP equipment and slurries are available for planarization of integrated circuits. Typically, a high-shearing type dispersion machine is used to produce the abrasive particles for a CMP slurry solution. However, current CMP slurries exhibit problems such as separation within the slurry of abrasive and additive particles, displacement of additives due to a shortage of chemical reactions between the abrasive and additive particles, and non-uniform distribution of the abrasive and/or additive particles in the slurry.

DETAILED DESCRIPTION

Figure 1:
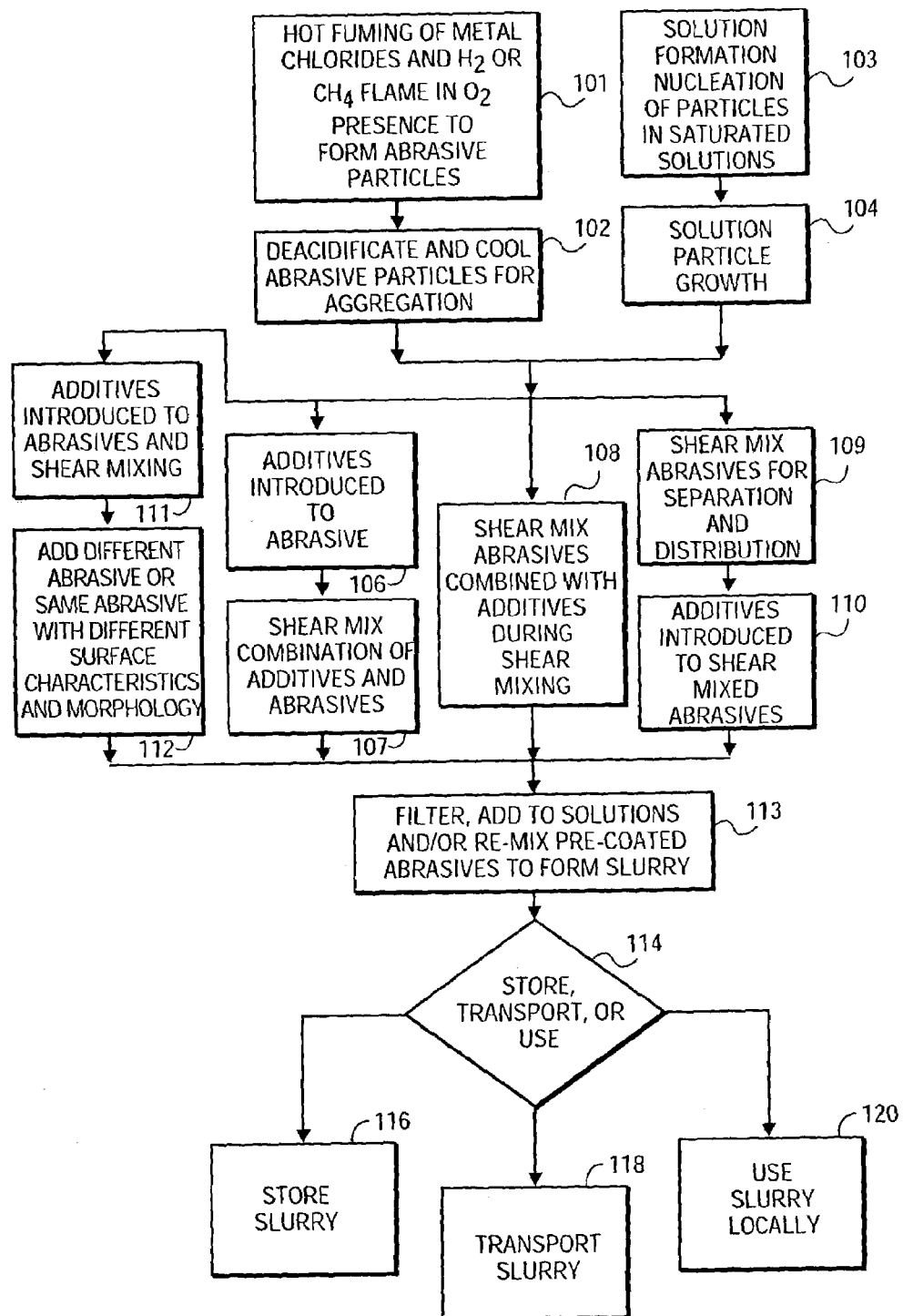
FIG. 1 is a block diagram describing the manufacture of pre-coated abrasive particles for use in a CMP slurry.

Methods, apparatus, and systems related to the manufacture and use of abrasive particles and abrasive particle slurries for the chemical mechanical polishing (CMP) of components during manufacture of circuit devices is described. According to embodiments, polishing slurry abrasive particles are pre-coated with additives, such as, inhibitors and/or surfactants during manufacture of the abrasive particles or slurry. The particles are described as "pre-coated" in one sense, because the additives are introduced (e.g., added, bonded, etc.) to the abrasive particles prior to the introduction of a chemical solution to form the chemical (solution) mechanical (pre-coated particle) polishing slurry. For example, a selected portion of a group of abrasive particles can be manufactured having a selection of additive inhibitor and/or surfactant particles chemically bonded to them for polishing semiconductor wafers, thin films, inter-layer dielectric, metals, and other circuit device components. In addition to planarization of wafers in the IC fabrication, planarization techniques (e.g., CMP) using such pre-coated particle slurries can be used in hard disk and CD manufacturing, optical materials and Micro Electro Mechanical Systems (MEMS) manufacturing. These pre-coated abrasive particles are then mixed with a solution to form a CMP slurry.

In the following description, the terms "pre-coated particles" or "pre-coating particles" describe a quantity of abrasive or other particles that have additives such as inhibitor and/or surfactant chemically bonded to them during manufacture. For example, pre-coated particles describes abrasive particles (alone or mixed in a slurry) that have inhibitor and/or surfactant particles chemically bonded to them before, during, or after the shear mixing. In addition, herein, the term "slurry" refers to a composition used for chemical-mechanical polishing (CMP) that generally includes a mixture of a solution that may or may not also contain an oxidizing agent, and a desired amount and type of abrasive particles that may or may not have interactions or attractions with additives. Moreover, the terms "manufacture", "production", "fabrication", "make", "construct", "form", "generate", and "create" are used to describe the various operations or events (whether necessary or not) included in creating abrasive particles or slurries for polish material using CMP or other appropriate methods. Furthermore, the terms "mix", "combine", "add", and "introduce" are used herein to describe the adding together of two substances, such as abrasive particles and additives Embodiments contemplate various interactions or attractions between abrasive particles and additives such as bonding (covalently, ionically, etc.), force interaction or attraction (e.g., Van der Waals force, etc.), and abrasives that adhere to or are fused with additives. For instance, an abrasive particle "pre-coated" with additive can explain a situation where the abrasive particle and additive are chemically bonded (e.g., by covalent electron sharing), or attracted by a Van der Waals force.

According to embodiments, a CMP slurry may include the pre-coated abrasives particles added to a solution that may include, for example, a base, an acid, a complexing agent and/or an aqueous surfactant such that improves the colloidal behavior of the abrasive particles in deionized water, and inhibits the growth and/or coalescence of the preexisting particles. Thus, for instance a complexing agent can be a commercially available aqueous mixture of 1) glycols such as ethylene glycol, propylene glycol and glycerol; 2) polyethers such as polyethylene glycol; 3) aliphatic polyethers; and/or 4) akoxylated alkyphenols. In addition, various other appropriate substances may be used for solution as provided by the current state of the art.

Suitable abrasive particles include particles such as (but not limited to) silica or silicon dioxide ($SiO_2$), ceria (CeO), alumina ($Al_2O_3$), or titanium oxide ($Ti_2O_3$), diamond (colloidal like), silicon carbide (SiC), and silicon nitride ($Si_3N_4$). In addition, various other appropriate substances may be used for abrasives as provided by the current state of the art. These abrasives can be used alone or as mixtures.

Moreover, embodiments provide for pre-coating particles with additives (e.g., generally, an "additive" is any substance that can be added to abrasive particles and water that does not cause the slurry to become unusable) such as surfactants, inhibitors, liquid polymers, oxidants, precursors to the aforementioned, and/or some ratio of all of the aforementioned. For instance, surfactants that wet the wafer surface or surface to be polished, and/or particle surface and change a hydrophilic or hydrophobic character of the surface, modify selectivity, and/or modify viscosity may be used. Also, additives may include inhibitors such as, but not limited to, TTA, benzotriazole (BTA), and various appropriate metal corrosion inhibitors. Likewise, additives may include oxidizing agents including, but not limited to, potassium ferricyanide, potassium dichromate, potassium iodate, hydrogen peroxide, iodinate, potassium bromate, and vanadium trioxide. Similarly, additives may comprise precursors capable of interacting with or attracting one or more additives. Various other appropriate substances may be used for additives as provided by the current state of the art.

As a result of embodiments, due to the additives opportunity to react directly with the abrasive particles early in the particle manufacturing process, the probability for the additives such as an inhibitor, surfactant, liquid polymer, and/or some ratio of any or all of those components to coat or adhere to the abrasive particle is increased. Depending on the ratio of the particle concentration to additives it is possible to thoroughly coat some selected or predictable percentage of the abrasive particles (including coating all abrasive particles). For example, two, three or more different types of coated particles can be used within one slurry. Since a coated particle will not usually be recoated, it is possible to use a coated and a non-coated particle in a single slurry. Therefore, one single slurry can include a particle coated with additives and another particle that is not coated at all. Also, the methodology will potentially decrease energy needed in the mixing and blending stage of the final product due to slow equilibrating additives and particles. Furthermore, the amount of contact of inhibitor with the polishing surface within the reach of abrasive particles is improved.

Moreover, according to embodiments, pre-coating the abrasive particles by introducing an inhibitor, such as BTA, or a surfactant, or both into a CMP slurry, will change the surface morphology and zeta potential of the particles. The result will be a decrease in the potential for particle agglomeration, and a substantial decrease or elimination in the use of inhibitors or surfactants in the slurry itself.

Thus, once the particle is pre-coated the use of particle dispersion in a slurry solution may also be minimized. This methodology will also provide a means to create a slurry with different particles that will behave and function differently depending on the process application and process stage (e.g., a slurry with a certain effectiveness during one CMP process and having another effectiveness during a subsequent CMP process).

Pre-Coating Methods During Abrasive Particle Manufacture

According to embodiments, coating of the abrasive particles with additives can be done before, during, or after (e.g., one particle manufacturing operation after) the shear-mixing or fuming operation of abrasive particle manufacturing. Fuming is a process used in manufacturing of the particle itself, that generally takes place before shear-mixing. Additionally, coating can be performed during any number of operations including before, during and after shear-mixing, solution mixing, and/or particle manufacturing.

For instance, FIG. 1 is a block diagram describing the manufacture of pre-coated abrasive particles for use in a CMP slurry. As shown in FIG. 1, abrasive particles are formed by fuming (heating) in heat pressure reaction (block101), and then cooled to create suitable sized particles for slurry (block102). For example, abrasive metal oxides can be formed by oxidation and flame hydrolysis of metal chloride vapor having metals that include Si, Ti, Al, Fe, and/or Zr. FIG. 1 also shows solution formation nucleation of particles in saturated solutions (block 103), followed by solution particle growth (block 104). Thus, particle formation by hot fuming and/or solution formation may be used in an embodiment of the invention, although particle formation by various other appropriate methods are also within the contemplation and scope of the invention. Afterwards, the created abrasive particles may be pre-coated with additives in at least one of the following four ways. First, the created abrasive particles may be pre-coated with additives by introducing one or more additives collectively or in series to the created abrasive particles (block 106) prior to shear mixing of the combination. Then, the combination of additives and created abrasive particles can be shear mixed (block 107) for separation and to form abrasive particles pre-coated with additives (e.g., to form uniform distribution of the pre-coated abrasive particles). As such, embodiments contemplate introduction of the additives to the created abrasive particles seconds, minutes, days, or longer periods prior to shear mixing of the combination in order to provide a desired chemistry. Second, the created abrasive particles may be pre-coated with additives by introducing one or more additives collectively or in series to the created abrasive particles during shear mixing of the combination (block 108) for separation and to form abrasive particles pre-coated with additives (e.g., to form uniform distribution of the coated abrasive particles). Third, the created abrasive particles may be pre-coated with additives by introducing one or more additives collectively or in series to the created abrasive particles (block 110) after shear mixing of the created abrasive particles. Here, the created abrasive particles can be shear mixed (block 109) for separation and to form uniform distribution of the pre-coated abrasive particles. Then, the shear mixed abrasive particles can be introduced to additives (block 110) to form abrasive particles pre-coated with additives. Embodiments also contemplate introducing the created abrasive particles with additives as described above, without shear mixing of the particles. Fourth, the additive(s) is introduced to the abrasive during the shear-mixing stage (block 111) and once coated the abrasives are then added, moved, transferred to another vessel for additional shear-mixing including addition/introduction of same abrasives with different surface morphology that are not coated (block 112) with additives or an addition/introduction of different abrasives to the pre-coated abrasives. For instance, after the additives and abrasives are combined, a second shear mixing operation can be used to select out certain ones of abrasive particles with and/or without additive coatings to provide a selected ratio of such particles.

Additionally, filtering, combining with a solution, and/or re-mixing the pre-coated abrasive particles with another slurry 113 can be used to provide a slurry having a selected ratio of additive coated abrasive particles as compared to the abrasive particles not coated by additives. A final version of pre-coated abrasive particle slurry can then be manufactured for storage, transport, and/or at point of use polishing 114. For instance, a slurry can be created having a ratio of pre-coated abrasive particles such that the slurry reaches a stable, selectable, and/or predictable enough particle state to be stored 116, transported 118, and/or used locally 120, say 30 minutes after creation of the slurry, for chemical-mechanical polishing.

The shear-mixing stage of abrasive particle manufacturing is typically used to de-agglomerate the abrasive particles (e.g., silica, ceria, and/or alumina) from each other and to provide particle dispersion as well as pH adjustment (e.g., block 106). According to embodiments, this operation can be used to introduce additives to the abrasive particles. For example, FIG. 2 is a cross-sectional illustration showing a shear mixer and pre-coated abrasive particle manufactured with additive coatings by mixing.

Figure 2:
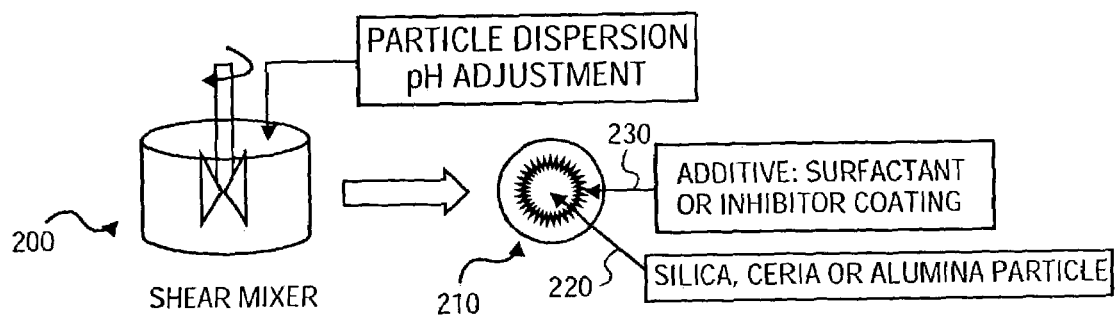
FIG. 2 is a cross-sectional illustration showing a shear mixer and a pre-coated abrasive particle manufactured with additive coatings by mixing.

As shown in FIG. 2, shear mixer 210 is used to precoat abrasive particle 200 with additives. In this example, the abrasive particles are pre-coated before they are added to a chemical solution to form a CMP slurry. Embodiments also consider pre-coated abrasive particles that have inhibitor and/or surfactant bonded to them before, during, or after shear mixing, fuming, filtering, selection, collection, sorting, segregation, and/or isolation. As shown in FIG. 2, pre-coated particle 210 is comprised of abrasive center portion 120 coated or surrounded by additive 230. This coating or bonding includes various interactions or attractions between abrasive particles and additives such as covalent and ionic bonding, as well as force attractions such as Van der Waals force. It should be pointed out that both full coverage, as well as partial coverage of an abrasive core by additives are plausible according to the invention. Using this methodology or system, the surface morphology of abrasive particles 220, such as silica, ceria, alumina, or titanium dioxide, can be changed due to the surface of the abrasive particle being coated by additive 230. As such, additive coating 230 (e.g., surfactant, inhibitor, liquid polymers, oxidizer, precursor, and/or some ratio of all) can change the abrasive particle's interaction with its surrounding environment. For instance, inhibitor and/or surfactant can be added to the shear-mix slurry to create pre-coated particles to inhibit corrosion, and surface defectivity, especially in case of metal CMP processes such as copper.

Figure 3:
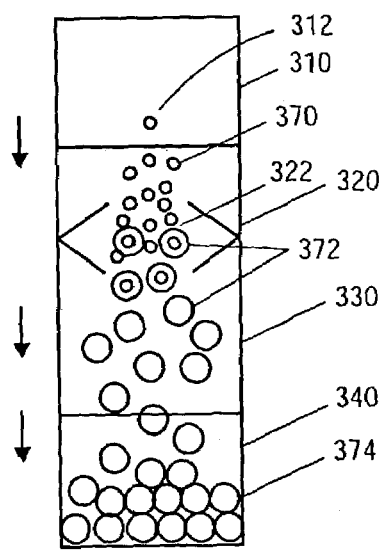
FIG. 3 is a cross-sectional illustration showing a fuming chamber and pre-coated abrasive particles manufacture with additive coatings by fuming.

Also, according to embodiments, a fuming process can be used independently or in conjunction with shear mixing, as well as various other appropriate mixing operations and/or solutions to form pre-coated abrasive particles, during abrasive particle and/or pre-coated abrasive particle production. FIG. 3 is a cross-sectional illustration showing a fuming chamber and pre-coated abrasive particles manufactured with additive coatings by fuming. Abrasive particles 370 formed then pass into combining region 320 (e.g., spray region) where they are combined with one or more additives 322 collectively or in series to form pre-coated abrasive particles 372 made up of ones of abrasive particles coated with one or more types of additive 322 (e.g., one or more inhibitor(s) and/or surfactant(s) added collectively, or in series, in any order). The pre-coated particles are then cooled in cooling region 330 (e.g., to create pre-coated particles of a particular size). The cooled pre-coated abrasive particles 374 are then collected in collection chamber 340 for use in the next slurry manufacturing operation (e.g., mixed with a solution to form slurry).

Correspondingly, embodiments may incorporate mixture in a solution of additives and abrasives (e.g., mixture without a shear mixer) independently or in conjunction with shear mixing and/or fuming, as well as other appropriate operations, during abrasive and/or pre-coated abrasive particle production. Various other appropriate coated particle mixing and slurry fabrication techniques for selecting a ratio of coated abrasives, non-coated abrasives, solution, oxidizer, inhibitor, surfactant, precursor, and/or other additives may be performed during any number of manufacturing operations including before, during and after shear-mixing, solution mixing, and/or fuming operations.

Pre-Coating Compositional Mixtures

Figure 4:
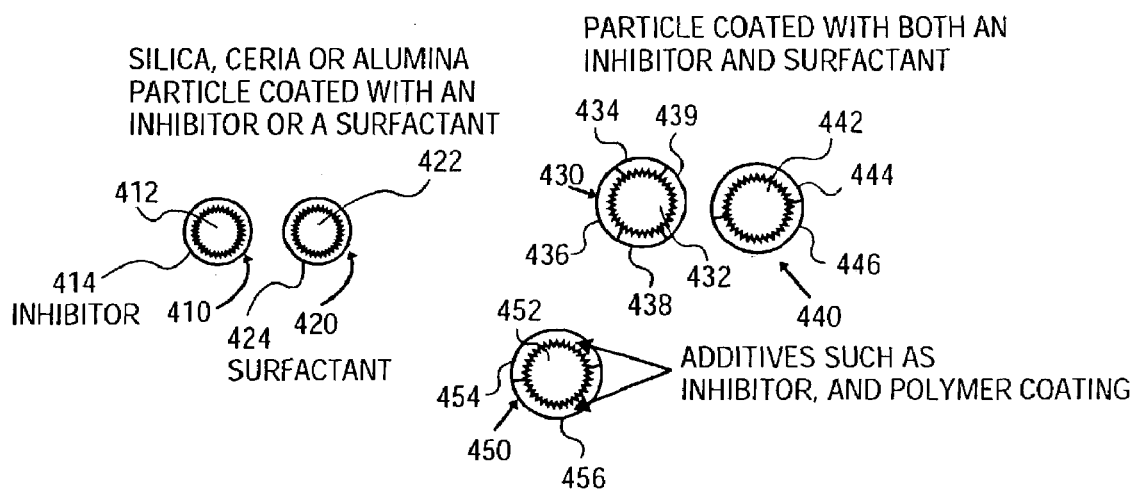
FIG. 4 is a cross-sectional illustration showing pre-coated abrasive particles manufactured with surfactant and/or inhibitor coatings.

According to embodiments, depending on the ratio of the particle concentration to various additive concentrations in a mix, it is possible to thoroughly coat some selected or predictable percentage or ratio of the abrasive particles (including coating all abrasive particles) with a selection of one or more additives. Particularly, abrasive particles 220 may be pre-coated with additives 230 such as an inhibitor, surfactant, oxidizer, pH buffer (or pH stabilizing agent), precursor, and/or liquid polymer, or some combination or ratio of any or all the above. For instance, FIG. 4 is a cross-sectional illustration showing pre-coated abrasive particles 410 manufactured with surfactant and/or inhibitor coatings. As a result, an abrasive particle may be manufactured with only one additive coating such as pre-coated particle 410 or pre-coated particle 420. As shown in FIG. 4, pre-coated particle 410 comprises abrasive particle 412 pre-coated with inhibitor 414. Similarly, pre-coated particle 420 is comprised of abrasive center portion 422 pre-coated or surrounded with surfactant 424.

Moreover, an abrasive particle may be pre-coated with any combination, order, or number of surfactant, inhibitor, oxidizer, pH buffer, precursor, and/or liquid polymers. Thus, particles may be pre-coated with two different additives or with various types of surfactant, inhibitor (e.g., such as a buffer adjusting pH component), and liquid polymers. As shown in FIG. 4, pre-coated particle 440 comprises an abrasive particle 442 pre-coated with an inhibitor 444 and with surfactant 446. Similarly, pre-coated particle 430 is comprised of abrasive center portion 432 pre-coated or surrounded with two types of surfactant 434 & 438, and two types of inhibitor 436 & 439. Likewise, pre-coated particle 450 comprises an abrasive particle 452 pre-coated with inhibitor 454 and with a polymer coating 456 (e.g., bonded from a liquid polymer solution).

Likewise, the abrasive particles described above may be pre-coated with a selected amount of one or any number of surfactant, inhibitor, and/or liquid polymer additives. Thus, a selection of pre-coated abrasive particles may be manufactured having particles that are partially or fully pre-coated with one single, or two or more different additives. For instance, pre-coated particle 440 comprises abrasive particle 442 pre-coated half with inhibitor 444, and half with surfactant 446. Similarly, pre-coated particle 430 comprises abrasive particle 432 pre-coated one quarter with one type of inhibitor 436, one quarter with a second type of inhibitor 439, one quarter with one type of surfactant 434, and one quarter with a second type of surfactant 438. In forming a slurry, these selections can now be mixed to form a desired slurry comprising a ratio of completely and partially pre-coated abrasive particles. The selections can also be mixed to form a slurry having a mixture of completely and partially pre-coated abrasive particles, as well as non-pre-coated abrasive particles.

Moreover, according to embodiments during manufacture or slurry formation various factors can be used to adjust the ratio of: 1) pre-coated abrasive particles (including the ratio of coatings having different percentages of various additive compositions, such as part surfactant part inhibitor, all surfactant, and/or all inhibitor), 2) non-coated abrasive particles, and 3) non-interacting additive particles. For instance, such factors include but are not limited to: 1) the number and types of compositions that make up the additives and the chemical comparison of the additives to the abrasive particles; 2) the amount of additives introduced to the abrasive particles; 3) a time period of the introduction of the additives to the abrasive particles; 4) a temperature of the abrasive particles and additives during the introduction of the additives; and 5) an atmospheric pressure applied to the abrasive particles and to the additive during the introduction of the additives to the abrasive particles. Various other appropriate factors may be used to adjust the amount, ratio, and types of additives mixed with abrasives as is provided by the current state of the art.

Adjusting factors such as those described above to mix additives and abrasive particles during abrasive particle manufacture, allows for known, stable, selectable, and predictable amounts or ratios of pre-coated abrasive particles as compared to abrasive particles without additives to be formed. Hence, for instance, the mixture of coated and un-coated particles can be controlled by modifying the type and percent of additive introduced for bonding with the abrasive particles in a particle shear-mixing process. For example:

$$\frac{100 \text{ ml}}{10 \text{ min}} \text{additive } A \Rightarrow 15\% \text{ of abrasives covered} \quad \text{(a)}$$

$$\frac{100 \text{ ml}}{10 \text{ min}} \text{additive } B \Rightarrow 25\% \text{ of abrasives covered} \quad \text{(b)}$$

In Equation a), 100 milliliters of additive "A" (e.g., an additive as described herein that is different than additives "B", "C", or "D") is introduced to a selected plurality of abrasive particles for 10 minutes. The result is a selected ratio where 15% of the abrasive particles have become pre-coated abrasive particles (coated with additive "A"), and the other 85% of the abrasive particles are non-coated. In a like manner, in Equation b), 100 milliliters of additive "B" (e.g., an additive as described herein that is different than additives "A", "C", or "D") is introduced to a selected plurality of abrasive particles for 10 minutes. The result is a selected ratio where 25% of the abrasive particles have become pre-coated abrasive particles (coated with additive "B"), and the other 75% of the abrasive particles are non-coated. Moreover, these selections can now be mixed to form a desired slurry comprising a ratio of combined abrasive particles pre-coated with additive "A", abrasive particles pre-coated with additive "B", and non-pre-coated abrasive partides, for instance, mixing equal portions of results from Equation a) with results from Equation b) will provide a selection having a ratio where 7.5% of the abrasive partides have become pre-coated abrasive particles (coated with additive "A"), 13.5% of the abrasive partides have become pre-coated abrasive partides (coated with additive "B"), and the other 79% of the abrasive partides are non-coated. Indeed, pre-coated partides can also be gathered from the selections and mixed to form a slurry of abrasive particles pre-coated with additive "A" and abrasive particles pre-coated with additive "B" that does not include non-pre-coated abrasive particles.

The ensuing example shows two types of additives being simultaneously mixed with abrasive particles:

$$[\frac{100 \text{ ml}}{10 \text{ min}} \text{additive } C] \text{ and } [\frac{100 \text{ ml}}{10 \text{ min}} \text{additive } D] \Rightarrow 25\% C, \quad \text{(c)}$$
$$10\% D, \& 5\% CD$$

In Equation a), 100 milliliters of additive "C" (e.g., an additive as described herein that is different than additives "A", "B", or "D") and 100 milliliters of additive "D" are introduced to a selected plurality of abrasive particles for 10 minutes. The result is a selected ratio comprising 25% pre-coated abrasive particles coated with additives "C", 10% pre-coated abrasive particles coated with additive "D" 10 (e.g., an additive as described herein that is different than additives "A", "B", or "C"), 5% pre-coated abrasive partides coated with additive "C" and "D", and the other 60% of the abrasive particles are non-coated. Again. portions. selections, or gatherings of these particles can be combined with those resulting from Equation a) and/or Equation b) as described above.

Likewise, the type and mixture of coated and un-coated particles can be controlled by modifying the type and time period of the introduction of the additives to the plurality of abrasive particles during pre-coating in a particular shear-mixing process. The following is an example where both the amount and types of additives introduced and a time period of the introduction of the additives to the abrasive particles are modified:

$$[\frac{150 \text{ ml}}{20 \text{ min}} \text{additive } C] \text{ and } [\frac{100 \text{ ml}}{10 \text{ min}} \text{additive } D] \Rightarrow 50\% C, \quad \text{(d)}$$
$$10\% D, \& 10\% CD$$

In Equation d), 150 milliliters of additive "C" is introduced for 20 minutes and 100 milliliters of additive "D" is introduced for 10 minutes to a selected plurality of abrasive particles. The result is a selected ratio comprising 50% pre-coated abrasive particles coated with additive "C", 10% pre-coated abrasive particles coated with additive "D", 10% pre-coated abrasive particles coated with additive "C" and "D", and the other 30% of the abrasive particles are non-coated. Again, portions, selections, or gatherings of these particles can be combined with those resulting from Equations a), b) and/or c) as described above.

Moreover, according to embodiments, a solution used to create a selection of pre-coated particles in one mixing stage (e.g., solution and results of Equation c)) can then be added to (e.g., add solution of Equation a)) to create another result in a subsequent mixing stage. In this manner, two resulting ratios of pre-coated particles can be efficiently produced by adding additive to a single solution. For instance, taking the solution of Equation c) and adding the additives of Equation a) gives:

$$[\frac{100 \text{ ml}}{10 \text{ min}} \text{additive } A] \text{ and } [\frac{100 \text{ ml}}{10 \text{ min}} \text{additive } C] \quad \text{(e)}$$
$$\text{and } [\frac{100 \text{ ml}}{10 \text{ min}} \text{additive } D] \Rightarrow 9\% A, 22\% C, 9\% D, \& 4\% CD$$

In Equation e), 100 milliliters of additive "A", 100 milliliters of additive "C", and 100 milliliters of additive "D" are introduced for 10 minutes to a selected plurality of abrasive particles. The result is a selected ratio comprising 9% pre-coated abrasive particles coated with additive "A", 22% pre-coated abrasive particles coated with additive "C", 9% pre-coated abrasive particles coated with additive "D", 4% pre-coated abrasive particles coated with additive "C" and "D", and the other 56% of the abrasive particles are non-coated. Again, portions, selections, or gatherings of these particles can be combined with those resulting from Equations a), b), c) and/or d) as described above. Also, in an embodiment of the invention, two different and distinct particle sizes may be used to create slurries that are pre-coated. For instance, abrasive A with a particular size which is statistically different in size and size distribution from abrasive B, can be coated with additives and/or inhibitors. The additives and/or inhibitors coating abrasive A can be similar or different from the additives and/or inhibitors that have been used to coat abrasive B. Therefore, upon manufacturing the slurry, one can use these two differently coated abrasives with different size (e.g., abrasives A and B) and coated with different additives to accomplish planarization selectivity or enhance planarization capability.

Consequently, according to embodiments, known types, amounts, and ratios of pre-coated and non-coated abrasive particles can be selected and collected from various mixing stages (e.g., as described above with respect to initial and subsequent mixtures) to manufacture abrasive particles mixtures and slurries having a variety of predictable and selectable combinations and ratios of pre-coated and non-coated abrasive particles.

Moreover, embodiments contemplate using various mixing stages (e.g., as described above with respect to initial and subsequent mixtures) to improve population control of abrasives, coated-abrasive, and additives in the slurry; decrease potential for particle agglomeration due to the changed surface morphology and zeta potential of the pre-coated abrasive particles; reduce separation within slurry of abrasives, coated abrasives, and additives; reduce displacement of additives due to chemical reactions possibly not taking place (e.g., between abrasives and additives); reduce non-uniform distribution in the slurry (e.g., between abrasives and abrasives, additives and additives, and abrasives and additives); and decrease abrasive particle dispersion in the slurry.

In addition, according to embodiments, pre-coated abrasive particle slurries may be used during various processes and on various components during the manufacture of circuit devices (e.g., semiconductor integrated circuits) including, but not limited to, CMP of thin films, CMP of whole wafers, the formation of interconnections, and the planarization of various layers. For instance, the pre-coated particles can be used to polish other materials including but not limited to tungsten silicide, copper and titanium nitride. In fact, the pre-coated particles can be applied to CMP processes used in areas other than semiconductor processing such as flat panel display. Additionally, pre-coated particles can be used to improve processes where inhibitor or surfactant or both are added to the slurry to prohibit corrosion, and surface defectivity, such as metal CMP processes, and specifically copper CMP where the requirements for the surface defectivity are very tight, consequently allowing, slurry manufacturing suppliers for such CMP processes to manufacture and sell superior pre-coated abrasives and slurries.

Figure 5:
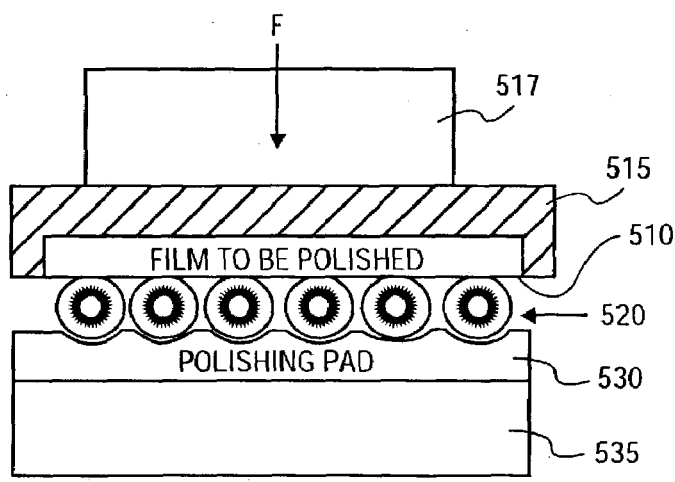
FIG. 5 is a cross-sectional illustration showing a semiconductor film being polished by pre-coated abrasive particles manufactured with additive coatings.

As an example, FIG. 5 is a cross-sectional illustration showing a semiconductor film being polished by a CMP including pre-coated abrasive particles. FIG. 5 shows semiconductor film 510 being polished by pre-coated abrasives 520. According to FIG. 5, the substrate or wafer 515 having film 510 is placed face-down on polishing pad 530 which is fixedly attached to rotatable table 535. In this way, thin film 510 may be placed in direct contact with pad 530. Carrier 517 is used to apply a downward pressure against the backside of substrate 515. During the polishing process, pad 530 and table 535 are rotated while a downward force "F" is placed on substrate 515 by carrier 517. The abrasive and chemically reactive "slurry" 520 can be deposited onto pad during or prior to polishing. Slurry 520 initiates the polishing process which may begin, for example, when slurry 520 chemically reacts with film 510 being polished. The polishing process is facilitated by the rotational movement of pad 530 relative to wafer 515 as slurry 520 is provided to the wafer/pad interface. According to embodiments, pre-coated abrasive particle slurry may be added prior to or after the above described polishing contact or rotation begins.

As mentioned, pre-coating gives the additives opportunity to react directly with the abrasive particles early in the particle manufacturing process. This opportunity increases the probability for the additives to coat or adhere to the abrasive particles, which creates an increased contact of inhibitor with the polishing surface within reach of the abrasives, as well as a decrease in the potential for particle agglomeration. The effect, as shown in FIG. 5, is an improved chemical and mechanical interaction of the slurry (e.g., abrasive pre-coated particles 520) and the material to be polished (e.g., film 510). In addition, because the pre-coated abrasive particles can be pre-coated by "polymer like" materials, the surface defectivity on the film being polished may be decreased.

Precursor Pre-Coating Embodiment

Figure 6:
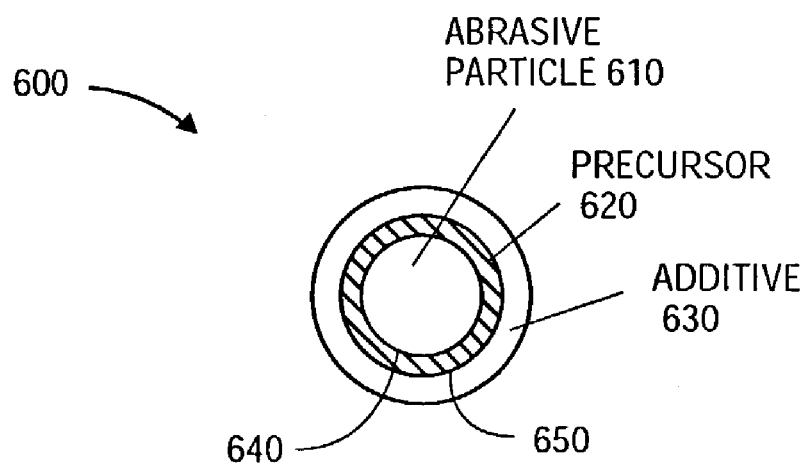
FIG. 6 is a cross-sectional illustration showing a pre-coated abrasive particle manufactured with an additive precursor coating which is in turn coated with an additive.

According to embodiments, a portion of the abrasive particles can be manufactured having partial or complete pre-coatings of one or more additive precursors. Thus, the abrasive particle does not bond with an additive, but instead is combined (e.g., coated) with a precursor able to bind one or more additives to the abrasive particle. For instance, FIG. 6 is a cross-sectional illustration showing a pre-coated abrasive particle manufactured with an additive precursor coating which is in turn coated with an additive. As shown in FIG. 6, pre-coated abrasive particle 600 comprises an abrasive particle 610 coated partially or completely with precursor 620. Precursor 620 can in turn be coated partially or completely with one or more additives 630.

Figure 7:
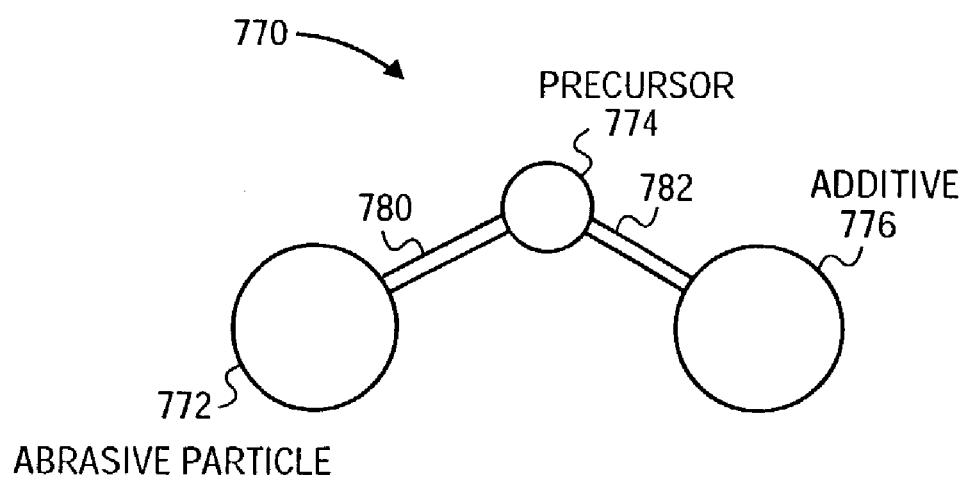
FIG. 7 is a cross-sectional illustration showing a pre-coated abrasive particle manufactured with a precursor particle covalently bonded to it which is in turn covalently bonded to an additive particle.

Interaction 640 between the abrasive particle and precursor coating may include bonding, or attractions such as covalent and ionic bonding, and force attractions such as Van der Waals force. Interaction 650 between the precursor and additive(s) may also include bonding, or attractions such as covalent and ionic bonding, and force attractions such as Van der Waals force. For example, FIG. 7 is a cross-sectional illustration showing a pre-coated abrasive particle manufactured with a precursor particle covalently bonded to it which is in turn covalently bonded to an additive particle. As shown in FIG. 7, pre-coated abrasive particle 770 comprises abrasive particle 772 covalently bonded 780 to precursor 774 which is in turn covalently bonded 782 to additive 776.

The slurry and additive particles, pre-coating methods, and pre-coating systems described above, also apply to pre-coating abrasives with precursor(s) and resulting slurries thereof. Thus, during manufacture, all or a selected ratio of the abrasives can be partially or completely pre-coated with one or more types of precursors for inhibitors, surfactants, oxidizers, chelating agents, and/or liquid polymers, or some combination or ratio of any or all the above. In addition, the particles pre-coated with precursors can also be directly coated with additives (e.g., additives directly bonded to the abrasive particle and not to the precursor) in addition to the precursor(s) as desired.

While various embodiments of the invention have been described, those skilled in the art will recognize that the potential embodiments of the invention are not limited to those embodiments described, but can be practiced with modification and alteration within the spirit and scope of the appended claims. The description is thus to be regarded as illustrative instead of limiting.

What is claimed is:

1. A method comprising:
    manufacturing a plurality abrasive particles by fuming or shear mixing;
    coating the plurality of abrasive particles with a chemical mechanical polishing (CMP) additive during manufacturing of the abrasive particles; and
    mixing the coated abrasive particles with a solution to form a polishing slurry.

2. The method of claim 1, wherein manufacturing comprises forming particles of a size suitable for a polishing slurry to polish electronic devices on a silicon substrate.

3. The method of claim 2, wherein the plurality of abrasive particles are formed by shear mixing and the additive is introduced during shear mixing.

4. The method of claim 3, further comprising shear mixing said plurality of coated abrasive particles after coating and before mixing with the solution.

5. The method of claim 2, wherein the plurality of abrasive particles are formed using a fuming operation comprising combining the additive with the plurality of abrasive particles during a fuming process.

6. The method of claim 1, further comprising shear mixing said polishing slurry after mixing the plurality of coated abrasive particles with the solution.

7. The method of claim 1, wherein said additive is selected from the group consisting of a liquid polymer, an oxidant, and a precursor of the polymer or oxidant.

8. The method of claim 1, wherein the abrasive particles are selected from the group consisting of a metal carbide, and a metal oxide.

9. The method of claim 1, wherein said slurry is stable enough to be transported, from a location where said slurry was mixed, to a second location, and successfully used at least 30 minutes after mixing, for chemical-mechanical polishing at the second location.

10. A method comprising:
    a) manufacturing a plurality of abrasive particles by shear mixing uncoated particles with initially coated particles, wherein the initially coated particles are formed by fuming or shear mixing;
    b) coating the plurality of abrasive particles with a chemical mechanical polishing (CMP) additive during manufacturing of the abrasive particles; and
    c) mixing the coated abrasive particles with a solution to form a polishing slurry.

11. The method of claim 1, wherein coating further comprises adjusting one of the amount of additive introduced, the time period of the introduction, a temperature of the manufacturing during the introduction of the additive, and a pressure of the manufacturing during the introduction of the additive.

* * * * *